(12) United States Patent
Larson et al.

(10) Patent No.: US 11,934,484 B2
(45) Date of Patent: Mar. 19, 2024

(54) SYSTEMS AND METHODS FOR BUILDING IMAGE DATABASES TO FACILITATE COMPUTER VISION-BASED CONSUMER PRODUCT IDENTIFICATION

(71) Applicant: Walmart Apollo, LLC, Bentonville, AR (US)

(72) Inventors: Soren A. Larson, New York, NY (US); Soheil Salehian-Dardashti, Brooklyn, NY (US); Elizabeth J. Barton, East Setauket, NY (US); Victoria A. Moeller-Chan, Brooklyn, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 340 days.

(21) Appl. No.: 17/459,751

(22) Filed: Aug. 27, 2021

(65) Prior Publication Data

US 2022/0067436 A1 Mar. 3, 2022

Related U.S. Application Data

(60) Provisional application No. 63/070,992, filed on Aug. 27, 2020.

(51) Int. Cl.
| | |
|---|---|
| G06V 20/10 | (2022.01) |
| G06F 16/53 | (2019.01) |
| G06F 18/214 | (2023.01) |
| G06Q 10/087 | (2023.01) |
| H04N 23/90 | (2023.01) |

(52) U.S. Cl.
CPC ............ *G06F 18/214* (2023.01); *G06F 16/53* (2019.01); *G06Q 10/087* (2013.01); *G06V 20/10* (2022.01); *H04N 23/90* (2023.01)

(58) Field of Classification Search
CPC ..... G06F 18/214; G06F 16/53; G06Q 10/087; G06V 20/10; G06V 20/52; G06V 20/68; H04N 23/90; H04N 7/181; H04N 23/80
See application file for complete search history.

(56) References Cited

U.S. PATENT DOCUMENTS

| | | | |
|---|---|---|---|
| 6,204,763 B1 | 3/2001 | Sone | |
| 2014/0348384 A1* | 11/2014 | Kolehmainen | .... G06Q 10/0833 382/103 |

(Continued)

*Primary Examiner* — Chuong A Ngo
(74) *Attorney, Agent, or Firm* — Fitch, Even, Tabin & Flannery, LLP

(57) ABSTRACT

Systems and methods for facilitating computer-vision-based detection and identification of consumer products comprise a support surface for supporting thereon one or more consumer products to be detected and a plurality of digital cameras each arranged at a different height relative to the support surface and positioned such that a field of view of each of the digital cameras includes the consumer product(s) located on the support surface. Movement of the support surface and/or the digital cameras permits the digital cameras to capture images of the consumer product from different angles of view and up to a full 360 degree of rotation around the at least one consumer product. A computing device uses at least the image data from such images to train a computer vision consumer product identification model to generate a reference image data model to be used for recognition of the at least one consumer product.

20 Claims, 8 Drawing Sheets

(56) References Cited

U.S. PATENT DOCUMENTS

| | | | |
|---|---|---|---|
| 2016/0125265 A1* | 5/2016 | Xie | G06V 20/00 382/209 |
| 2017/0330059 A1 | 11/2017 | Novotny | |
| 2018/0232689 A1 | 8/2018 | Minvielle | |
| 2018/0239319 A1 | 8/2018 | Abdoo | |
| 2019/0378205 A1 | 12/2019 | Glaser | |

* cited by examiner

FIG. 4
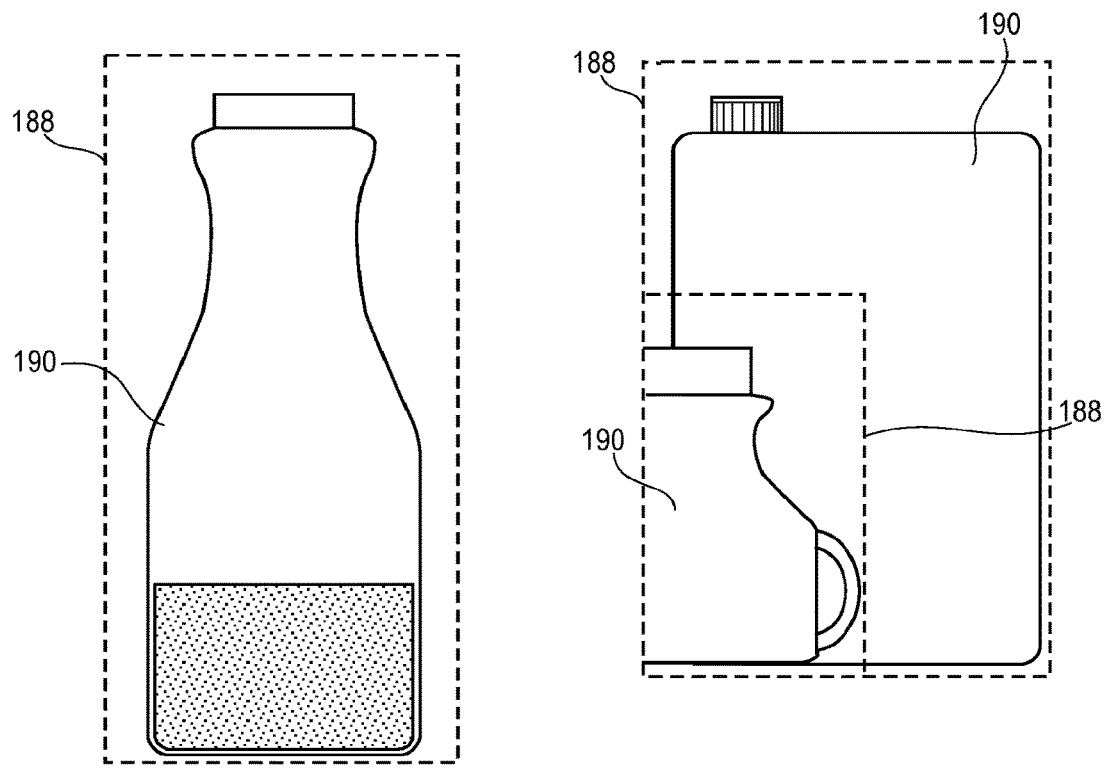
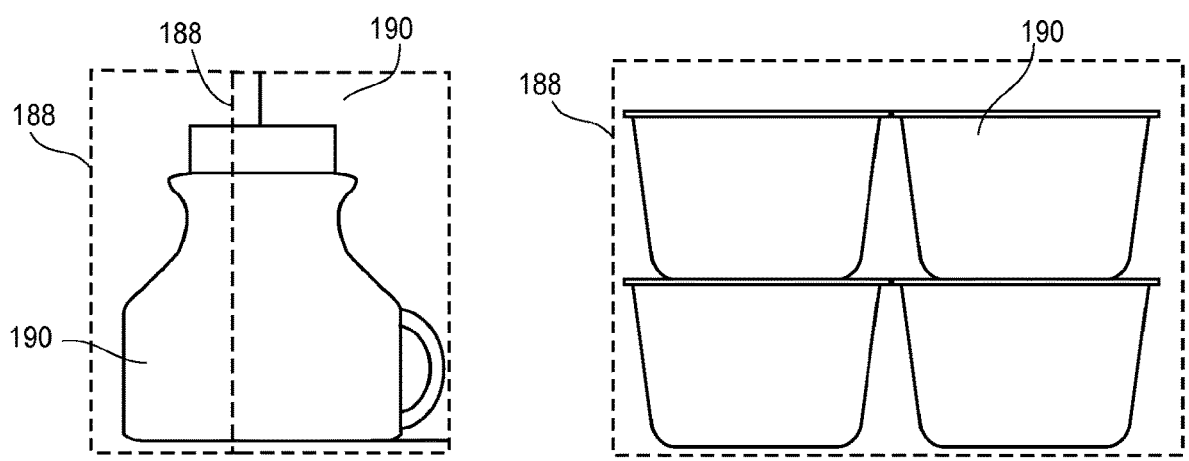

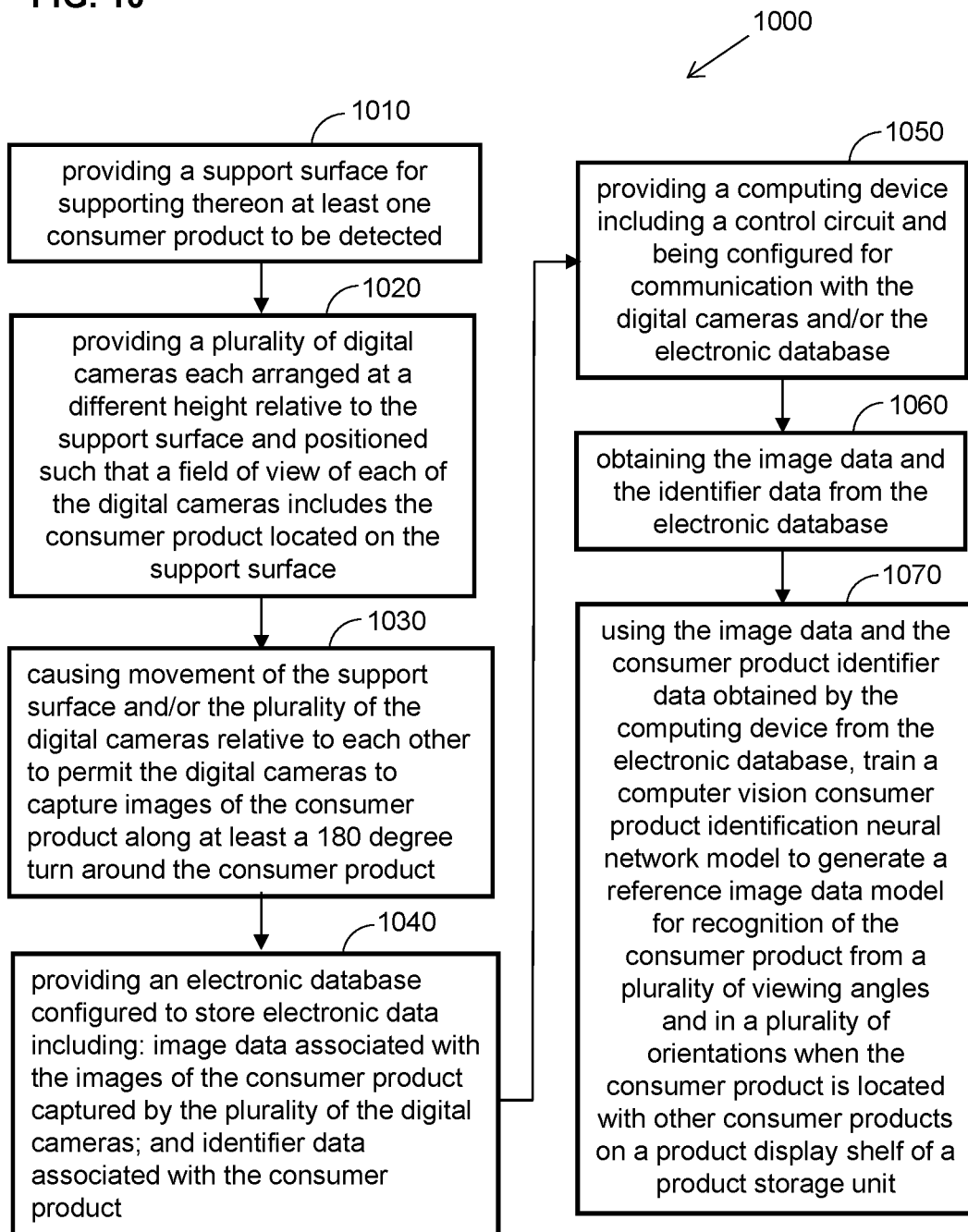

SYSTEMS AND METHODS FOR BUILDING IMAGE DATABASES TO FACILITATE COMPUTER VISION-BASED CONSUMER PRODUCT IDENTIFICATION

CROSS-REFERENCE TO RELATED APPLICATIONS

This application claims the benefit of U.S. Provisional Application No. 63/070,992, filed Aug. 27, 2020, which is incorporated herein by reference in its entirety.

TECHNICAL FIELD

This invention relates generally to consumer product identification, and in particular, to systems and methods for building image-based databases for facilitating computer vision-based recognition of consumer products.

BACKGROUND

Monitoring on-shelf inventory and replenishing the on-shelf inventory, when necessary, to avoid out of stock events and lost sales is very important to overall profitability of retail stores. Retailers also look for ways to add to their profitability by facilitating product reorders by their customers. One way to do so is to automatically replenish the on-shelf inventory of products of the customers before the products are almost or fully consumed. A system for in-home on-shelf inventory monitoring and auto-replenishment must be able to effectively detect and identify the products located in product storage units (e.g., refrigerators, pantries, etc.) of their customers. However, a given retailer typically offers for sale thousands of different consumer products that come in all kinds of different shapes and sizes (with some products being very similar in overall shape and size), and most retailers currently do not have product recognition databases that would enable detection and recognition of consumer products on a large scale required to make in-home on-shelf monitoring and product replenishment systems effective.

BRIEF DESCRIPTION OF THE DRAWINGS

Disclosed herein are embodiments of systems and methods of facilitating computer-vision-based detection and identification of consumer products. This description includes drawings, wherein:

FIG. 4 depicts images isolated from the image of FIG. 3, such that each of the isolated images includes image information located within a single virtual boundary line;

FIG. 10 is a flow chart diagram of a process of facilitating computer-vision-based identification of consumer products in accordance with some embodiments.

Figure 1:
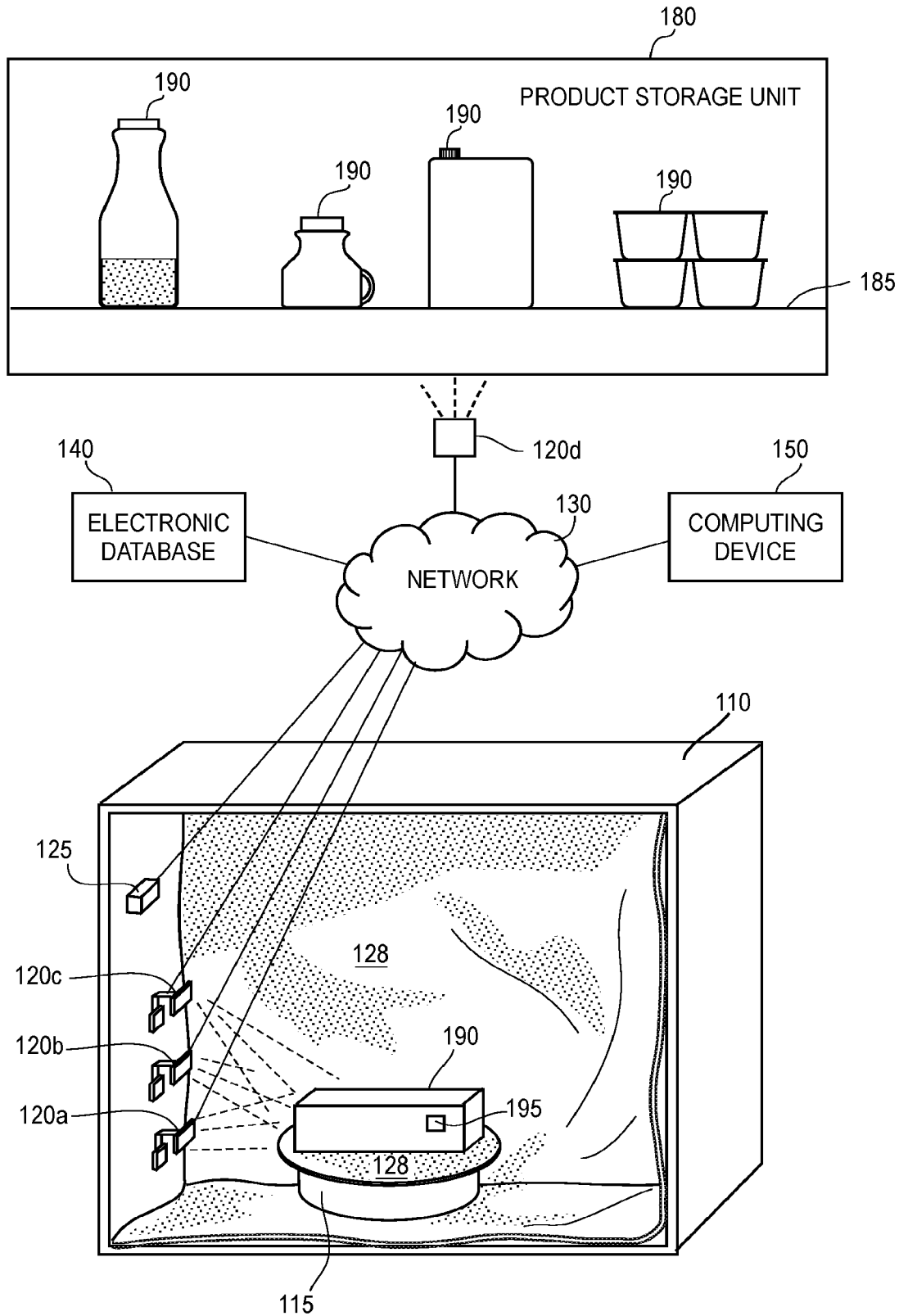
FIG. 1 is a diagram of a system of facilitating computer-vision-based detection and identification of consumer products in accordance with some embodiments.

Elements in the figures are illustrated for simplicity and clarity and are have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods for facilitating computer-vision-based detection of consumer products are described herein. Computer vision object detection generally involves detecting the existence and individual localization of objects (e.g., detection of a bottle, a can, a carton, a gallon, a package, etc. representing a consumer product) in their environment (e.g., on a product storage unit such as a shelf), as well as specific identification of products (e.g., identifying the specific stock keeping unit (SKU)/product brand and name associated with the detected object). Given that many consumer products share similar overall shapes/sizes, detecting the existence of, and localization of consumer products on a shelf, can provide a general idea of what the consumer product may be, but is typically not sufficient to identify the detected overall shape/size as a specific consumer product. In other words, while the localization of consumer products may generalize across multiple different products due to many consumer products having very similar overall shapes and sizes, a product identity is specific to each of the consumer products, and dominates the data storage requirements as compared to localization data.

Methods and systems described herein are directed to providing a scalable solution for collecting data sufficient to enable precise detection of consumer products on shelves of consumer product storage units and for precise consumer product identification over a very large variety of different consumer products. In particular, by separating (i.e., performing independently) the object localization function (i.e., finding one or more regions in an image where a consumer product is captured) from the object recognition part (i.e., identifying the consumer product located in a particular region of the image), the systems methods described herein are able to efficiently interconnect the object localization and identification algorithms to scale detection and recognition of consumer products by utilizing the data obtained in the more complex identification function to retrain the simpler localization function (e.g., by minimizing context-specific training data requirements by learning item-invariant object localization).

In some embodiments, a system for facilitating computer-vision-based identification of consumer products includes a support surface for supporting thereon at least one consumer product to be identified and a plurality of digital cameras each arranged at a different height relative to the support surface and positioned such that a field of view of each of the digital cameras includes the at least one consumer product located on the support surface. The movement of the support surface and/or the plurality of the digital cameras permits the digital cameras to capture images of the consumer product along at least a 180 degree turn around the consumer product. The system further includes an electronic database configured to store electronic data including image data associated with the images of the consumer product captured by the plurality of the digital cameras and identifier data associated with the consumer product. The system further includes a computing device in communication with the digital cameras and the electronic database. The computing device includes a control circuit configured to: obtain the image data and the identifier data from the electronic database and, using the image data and the consumer product identifier data obtained by the computing device from the electronic database, train a computer vision consumer product identification model to generate a reference image data model to be used for recognition of the at least one consumer product from a plurality of viewing angles when the at least one consumer product is located on a shelf of a consumer product storage unit.

In some embodiments, a method of facilitating computer-vision-based identification of consumer products includes: providing a support surface for supporting thereon at least one consumer product to be identified; providing a plurality of digital cameras each arranged at a different height relative to the support surface and positioned such that a field of view of each of the digital cameras includes the at least one consumer product located on the support surface; causing movement of at least one of the support surface and the plurality of the digital cameras relative to each other to permit the digital cameras to capture images of the at least one consumer product along at least a 180 degree turn around the at least one consumer product; providing an electronic database configured to store electronic data including: image data associated with the images of the at least one consumer product captured by the plurality of the digital cameras; and identifier data associated with the at least one consumer product. The method further includes providing a computing device in communication with the digital cameras and the electronic database. The method further includes obtaining, by the control circuit of the computing device, the image data and the identifier data from the electronic database, and using, by the control circuit of the computing device, the image data and the consumer product identifier data obtained by the computing device from the electronic database, train a computer vision consumer product identification model to generate a reference image data model for recognition of the at least one consumer product from a plurality of viewing angles when the at least one consumer product is located on a shelf of a consumer product storage unit.

FIG. 1 shows an embodiment of a system 100 of facilitating computer-vision-based detection of consumer products. The system 100 includes an image collection apparatus 110, which, as will be described below, is generally an apparatus for building a database of reference image data in connection with a wide variety of consumer products 190 to facilitate computer vision-based identification of such consumer products on shelves of various product storage units. The system 100 is shown in FIG. 1 for simplicity of illustration with only one image collection apparatus 110, but it will be appreciated that the system 100 may include more than one image collection apparatus 110 operatively connected via a network 130 to one or more electronic databases 140 and computing devices 150.

The exemplary image collection apparatus 110 in FIG. 1 includes a support surface 115 for supporting one or more consumer products 190. Exemplary products 190 may include, but are not limited to, any general-purpose consumer goods, as well as consumable products, such as food/grocery/beverage items, medications, and dietary supplements. It will be appreciated that the system 100 is not limited to generating a database of reference image data specifically for consumer products 190, but could be advantageously used for building an image database for certain objects that are not generally considered to be products that are offered for sale to consumers by retailers. In addition, while the systems and methods herein are described with reference to consumer product detection and identification in the context of monitoring and automatic replenishment of on-shelf inventory at facilities of retailers and in homes/businesses of the customers of the retailers, it will be appreciated that the consumer product detection and identification methods and systems described herein can be used for consumer product detection and recognition in other contexts, e.g., self-checkout terminals, slippage, omni-immersion, etc.

In some embodiments, customers opt-in (e.g., using a website or a mobile application) for a service that monitors and auto-replenishes products in their home/business. The systems and methods described herein can be configured to comply with privacy requirements which may vary between jurisdictions. For example, before any recording, collection, capturing or processing of customer data, a "consent to capture" process may be implemented. In such a process, consent may be obtained, from the customer, via a registration process. Part of the registration process may be to ensure compliance with the appropriate privacy laws for the location where the service would be performed. The registration process may include certain notices and disclosures made to the customer prior to the customer giving consent. In other words, the exemplary systems and methods described herein provide for no unauthorized/unconsented to collection or processing of data of customers.

In some embodiments, after registration, and before collection or processing of customer data, the system verifies that the customer as registered with the system and has provided the required consent for data collection. That is, the customer's registration status as having consented to the collection of the customer's data can be verified by the system prior to collecting any customer data. In some embodiments, once consent is verified, customer data can be captured, processed and used. Absent verification of consent, the customer data collection features of the system remain inactive. Once consent is verified, customer data collection features of the system may be activated. In some aspects, if the system detects that customer data was inadvertently collected from the customer prior to verification of that customer's consent to the data collection, such collected data is immediately deleted, not having been saved to disk.

In some embodiments, customer data captured as part of the verification process is handled and stored by a single party at a single location. In some aspects, where data must be transmitted to an offsite location for verification, certain disclosures prior to consent are required, and the customer data is encrypted. The hashing of the customer data received is a form of asymmetrical encryption which improves both data security and privacy, as well as reducing the amount of customer data which needs to be communicated. In some embodiments, the data being shared by the user can be changed by the user at any time. In one aspect, after the user opts in to share data, the user receives a notification of the active sharing relationship, for example, what information is being shared and how it will be used, as well as information on how to review and manage the user's active and inactive data sharing relationships. In some embodiments, the specifics of all active and inactive data sharing relationships of the user are provided to the user for review and/or modification within a data sharing relationship management interface.

In some embodiments (see, e.g., FIGS. 2-3), the support surface 115 is configured to rotate along at least a 180-degree revolution, but preferably, along a full 360-degree revolution from its starting point relative to an axis of rotation. In one aspect, the support surface 115 is in a form of an electrically powered turntable configured to rotate (e.g., in response to a control signal received from a control unit) at a predefined speed, for example, from 1 to 5 degrees per second.

The image collection apparatus 110 of the system 100 of FIG. 1 also includes one or more image capture devices 120a-120c that are positioned to each have a field of view that includes the support surface 115 and the object(s) (e.g., one or more consumer products 190) positioned thereon. In some embodiments, the image capture devices 120a-120c can include one or more sensors including but not limited to a motion-detecting sensor, an optical sensor, a photo sensor, an infrared sensor, a 3-D sensor, a depth sensor, a digital camera sensor, or the like.

In the embodiment shown in FIG. 1, the image capture devices 120a-120c are positioned at different heights relative to the support surface 115 to capture images of a consumer product 190 located on the support surface 115 from a variety of different angles of view. In particular, in the embodiment shown in FIGS. 1, 5, and 6, one image capture device 120a is positioned such that is it generally at the level of the support surface 115, one image capture device 120b is positioned such that may be generally near the top (above or below) of certain consumer products 190 located on the support surface 115, and one image capture device 120c is positioned such that it is significantly above the top of the consumer products 190 located on the support surface. The number of image capture devices 120a-120c and their mounting locations relative to one another and relative to the product support surface 115 are shown by way of example only, and it will be appreciated that more than three (4, 6, 8, 12, etc.) or less than three (1, or 2) image capture devices 120a-120c may be used, and that the image capture devices 120a-120c may be placed at different heights relative to the support surface 115 than the heights shown in FIG. 1.

Figure 5:
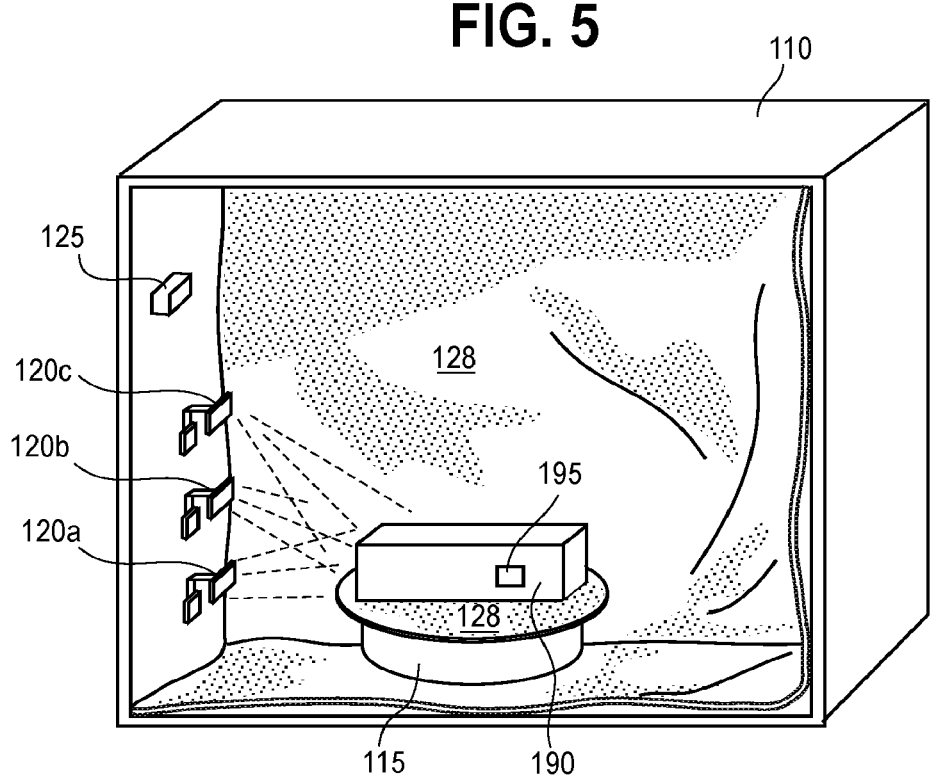
FIG. 5 is a perspective view of an image collection apparatus of FIG. 1, shown with a consumer product being positioned on the product support surface.
Figure 6:
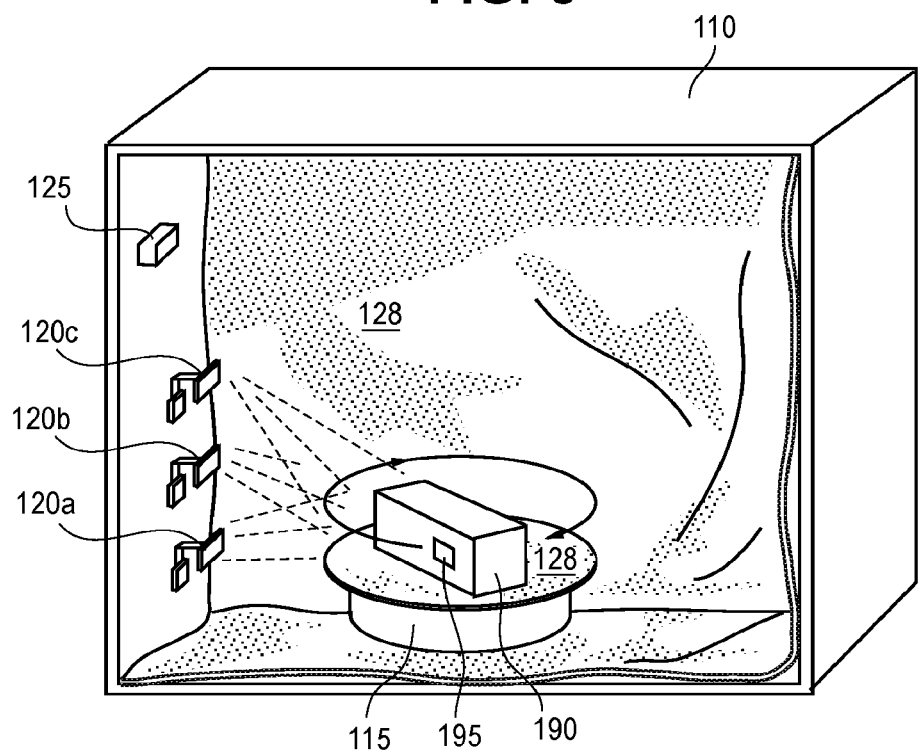
FIG. 6 is the same view as in FIG. 5, but showing the consumer product being rotated by approximately 45 degrees due to the rotation of the product support surface.

As mentioned above, the support surface 115 may be configured for rotation up to a full 360-degree revolution relative to an axis of rotation, and the image capture devices 120a-120c are fixedly mounted to a support surface of the image collection apparatus 110. In some embodiments, the image capture devices 120a-120c are configured to capture images of the consumer products 190 located on the support surface 115 at a predefined frame rate (e.g., from 1 to 10 frames per second). While FIGS. 5-6 illustrate the support surface 115 as being rotatable and the image capture devices 120a-120c being stationary, it will be appreciated that, in some embodiments, the support surface 115 may be fully stationary and incapable of rotation or any other movement, while the image capture devices 120a-120c may be configured for rotation or any other movement around the support surface 115 at a preset speed (e.g., from 1 to 5 degrees per second). As such, the movement of the support surface 115 and/or the image capture devices 120a-120c relative to each other permits the image capture devices 120a-120c to capture images of one or more consumer products 190 located on the support surface 115 along up to a full 360 degree turn around the consumer product(s) 190.

In some aspects, if the support surface 115 with a consumer product 190 thereon were configured to rotate 2 degrees per second, and each of the image capture devices 120a-120c were set to capture 1 frame per second, then each of the three image capture devices 120a-120c would capture 180 images of the consumer product 190 in 2 degree viewing angle increments, with each of the three image capture devices 120a-120c capturing an image from a different view angle since the cameras are positioned at different heights. As such, the three image capture devices 120a-120c would collectively capture 540 images of the consumer product 190 by the time the support surface 115 completes a full 360-degree revolution relative to its starting point. Similarly, if the support surface 115 with a consumer product 190 thereon were configured to rotate 1 degree per second and each of the image capture devices 120a-120c were set to capture 1 frame per second, then the three image capture devices 120a-120c would collectively capture 1080 images of the consumer product 190 by the time the support surface 115 completes a full 360 degree revolution relative to its starting point. As such, the image collection apparatus 110 advantageously provides for scalable consumer product data collection sufficient to facilitate computer vision identification of thousands of different (even if similar) consumer products 190.

In some embodiments, as will be described in more detail below, the images captured by the image capture devices 120a-120c while the consumer product 190 is on the support surface 115 are transmitted by the image capture devices 120a-120c over a network 130 to an electronic database 140 and/or to a computing device 150 for further processing. In some aspects, the image capture devices 120a-120c are configured to capture an image of the consumer product 190 located on the support surface 115, and to compress the image prior to transmitting the compressed image to another device (e.g., electronic database 140, computing device 150, etc.). This image compression by the image capture devices 120a-120c advantageously reduces the storage requirements of the electronic database 140, and advantageously reduces the processing power required of the computing device 150 to process the compressed images when attempting to extract data from the images.

In some embodiments, the image collection apparatus 110 includes one or more monochrome/matte (e.g., green, blue, grey, black, etc.) backgrounds 128 to reduce distortion in the background of the images of the consumer product 190 located on the support surface 115 when they are captured by the image capture devices 120*a*-120*c*. In the embodiments shown in FIGS. 5-6, the support surface 115 has a background 128 that is either painted to be monochrome or is covered by a monochrome material, and the image collection apparatus 110 includes a monochrome background 128 in the form of a material positioned below and around at least a portion of the support surface 115 in the field of view of the image capture devices 120*a*-120*c*.

The exemplary system 100 further includes an image capture device 120*d* for capturing images of consumer products 190 positioned on a shelf 185 of a product storage unit 180 (e.g., refrigerator, freezer, cabinet, cupboard, pantry of a consumer, or shelf unit/product display structure at a facility of a retailer). The system 100 is shown in FIG. 1 for simplicity of illustration with only one image capture device 120*d* monitoring one shelf 185 of one product storage unit 180 having only four consumer products 190 thereon, but it will be appreciated that the system 100 may include dozens/hundreds/thousands image capture devices 120*d* that monitor dozens/hundreds/thousands of shelves 185 of product storage units 180 at any number of facilities operated by a retailer and any number of homes/businesses of customers of the retailer.

Figure 2:
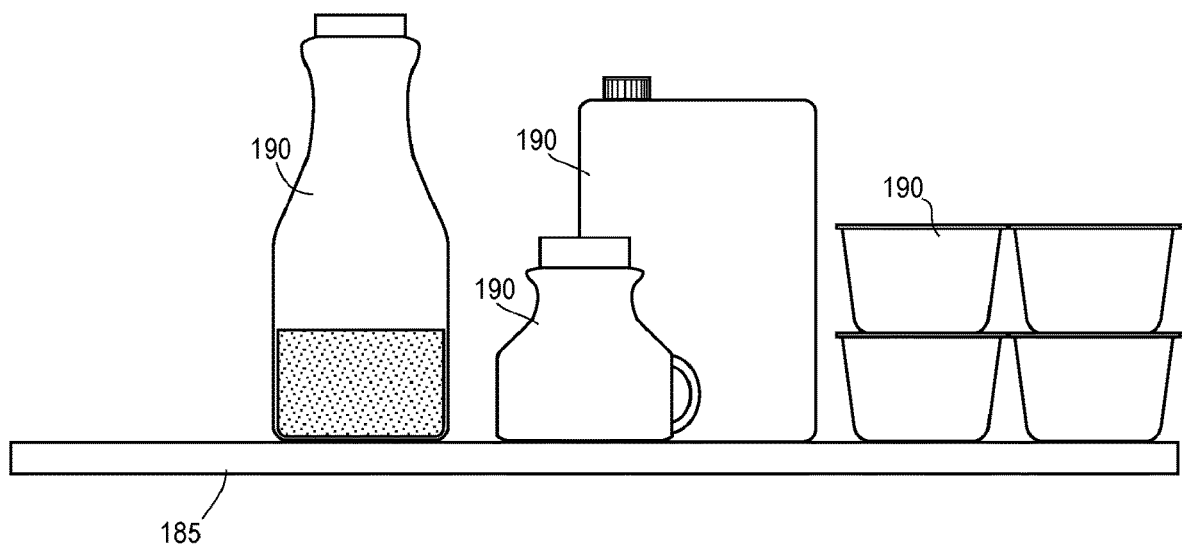
FIG. 2 depicts an image of a shelf of a product storage unit having several consumer products thereon, with one product being obstructed by another product.

The image capture device 120*d* of the system 100 depicted in FIG. 1 is configured and positioned to have a field of view that includes at least a portion of one or more shelves 185 of a product storage unit 180. FIG. 2 shows an exemplary image captured by the image capture device 120*d* of an exemplary shelf 185 including a number of consumer products 190. In some embodiments, as will be described in more detail below, the images of the shelf 185 of the product storage unit 180 captured by the image capture device 120*d* are transmitted by the image capture device 120 over a network 130 to an electronic database 140 and/or to a computing device 150. In some aspects, the computing device 150 (or a separate image processing cloud-based service module) is configured to: (1) process such images to detect (i.e., localize) each consumer product 190 in the image by generating a virtual boundary line 188 to surround each one of the consumer products 190 detected on the product display shelf 185 in the image (see FIG. 3); and (2) for each virtual boundary line 188 generated, crop an image including only the information within a perimeter of a selected virtual boundary line 188 to creating reference images (i.e., item masks) for each consumer product 190 (see FIG. 4) to facilitate the identification of the consumer products 190 using the images generated in the image collection apparatus 110.

In some embodiments, the system 100 further includes a scanner 125 including one or more sensors configured to identify the consumer product 190 to be imaged in image collection apparatus 110 by the image capture devices 120*a*-120*c*. In one aspect, the scanner 125 includes one or more sensors that care configured to scan an identifier (e.g., a label 195) of the consumer product 190, and, based on a scan of the identifier 195 of the consumer product 190 by the scanner 125, to generate identifier data, which may then be transmitted to the electronic database 140 for storage, or to the computing device 150 or a cloud-based image processing service for processing.

According to some embodiments, the scanner 125 can include one or more sensors including but not limited to a motion-detecting sensor, an optical sensor, a photo sensor, an infrared sensor, a 3-D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like. The identifying indicia or label 195 of the consumer product 190 that may be scanned by the scanner 125 may include, but is not limited to: two-dimensional barcode, RFID, near field communication (NFC) identifiers, ultra-wideband (UWB) identifiers, Bluetooth identifiers, images, or other such optically readable, radio frequency detectable or other such code, or combination of such codes.

With reference to FIG. 1, the exemplary system 100 includes an electronic database 140. In some embodiments, the electronic database 140 and the computing device 150 may be implemented as two separate physical devices. It will be appreciated, however, that the computing device 150 and the electronic database 140 may be implemented as a single physical device. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

Generally, the exemplary electronic database 140 of FIG. 1 is configured to store data associated with images and identities of the consumer products 190 captured by the image capture devices 120*a*-120*d* and the scanner 125. Some exemplary electronic data that may be stored in the electronic database 140 includes but is not limited to: (1) electronic data corresponding to unique identifiers of the consumer products 190 (e.g., which may be captured by the scanner 125 from the labels 195 of the consumer products 190); (2) electronic data corresponding to images of a shelf 185 of a product storage unit 180 including various consumer products 190 thereon; (3) electronic data corresponding to images of various consumer products 190 isolated within their respective virtual bounding lines 188 (item masks); (4) electronic data corresponding to various field of view images of various consumer products 190 captured by the image capture devices 120*a*-120*c* in the image collection apparatus 110; (5) electronic data corresponding to reference fill level data images depicting various fill levels (e.g., full, half-full 10% full, etc.) of certain consumer products 190 in the images captured by the image capture devices 120*a*-120*c*; (6) electronic data corresponding to pack number data indicating a number of individual items in a pack/stack of certain consumer products 190 in the images captured by the image capture devices 120*a*-120*c*; and (7) reference image data models and virtual bounding line models trained by the computing device 150 for a variety of the consumer products 190.

The system 100 of FIG. 1 further includes a computing device 150 configured to communicate with the electronic database 140, the image capture devices 120*a*-120*d*, and the scanner 125 over a network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some aspects, one or more electronic devices of system 100 may include cloud-based features, such as cloud-based computer vision application programming interfaces (APIs) and cloud-based memory storage.

The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. The computing device 150 may be located at the same physical location as the electronic database 140, or may be located at a remote physical location relative to the electronic database 140.

In some embodiments, the system 100 includes one or more localized Internet-of-Things (IoT) devices and controllers in communication with the computing device 150. As a result, in some embodiments, the localized IoT devices and controllers can perform most, if not all, of the computational load and associated monitoring that would otherwise be performed by the computing device 150, and then later asynchronous uploading of summary data can be performed by a designated one of the IoT devices to the computing device 150, or a server remote to the computing device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 150 or a server remote to the computing device 150.

Figure 7:
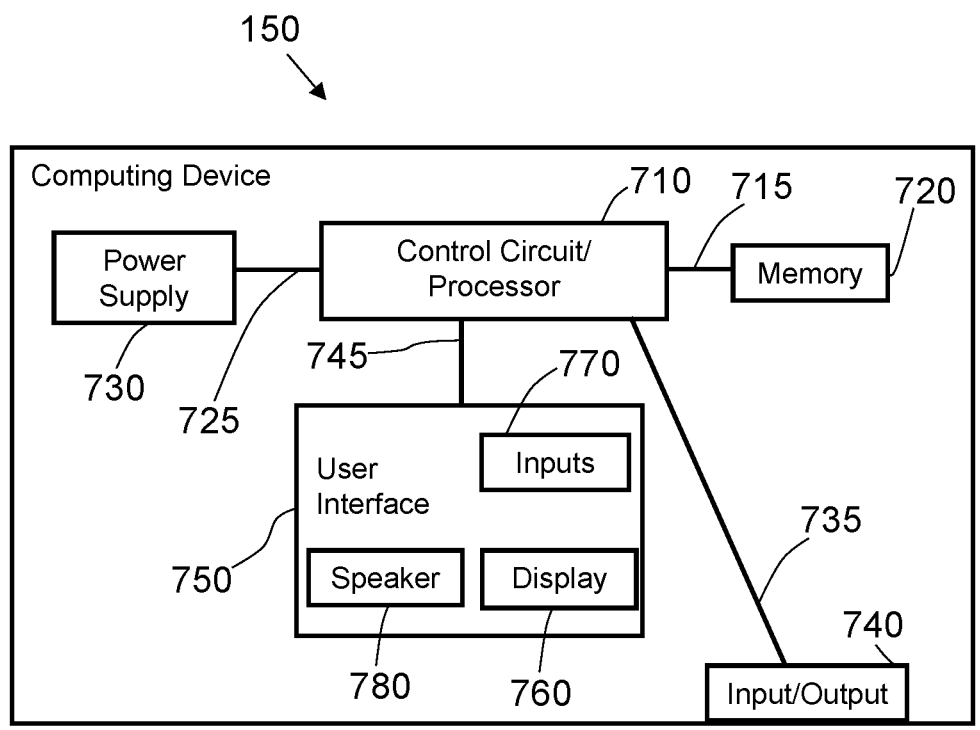
FIG. 7 is a functional diagram of an exemplary computing device usable with the system of FIG. 1 in accordance with some embodiments.

With reference to FIG. 7, the exemplary computing device 150 configured for use with exemplary systems and methods described herein may include a control circuit 710 including a programmable processor (e.g., a microprocessor or a microcontroller) electrically coupled via a connection 715 to a memory 720 and via a connection 725 to a power supply 730. The control circuit 710 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 710 can be configured (for example, by using corresponding programming stored in the memory 720 as will be well understood by those skilled in the art) to carry out one or more of the steps, actions, and/or functions described herein. In some embodiments, the memory 720 may be integral to the processor-based control circuit 710 or can be physically discrete (in whole or in part) from the control circuit 710 and is configured non-transitorily store the computer instructions that, when executed by the control circuit 710, cause the control circuit 710 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 710 of the computing device 150 is also electrically coupled via a connection 735 to an input/output 740 that can receive signals from, for example, from the image capture devices 120a-120d, scanner 125, electronic database 140, and/or from another electronic device (e.g., an electronic device of a worker of the retailer or a mobile electronic device of a customer of the retailer). The input/output 740 of the computing device 150 can also send signals to other devices, for example, a signal to the electronic database 140 to store and update reference image models and reference boundary line models associated with consumer products 190. Also, a signal may be sent, for example, to an electronic device of the worker to task the worker with replenishing a shelf 185, or to an electronic device of a customer, indicating that a replenishment order for one or more consumer products 190 is being processed for the costumer.

The processor-based control circuit 710 of the computing device 150 shown in FIG. 7 is electrically coupled via a connection 745 to a user interface 750, which may include a visual display or display screen 760 (e.g., LED screen) and/or button input 770 that provide the user interface 750 with the ability to permit an operator of the computing device 150 (e.g., worker at a the retail facility (or a worker at a remote control center) tasked with monitoring the inventory on the shelves 185 at the retail facility) to manually control the computing device 150 by inputting commands via touch-screen and/or button operation and/or voice commands. Possible commands may, for example, cause the computing device 150 to cause transmission of an alert signal indicating an actual or a forecasted out of stock event in association with one of the consumer products 190 stocked on the shelf 185.

In some aspects, the manual control by an operator of the computing device 150 may be via the user interface 750 of the computing device 150, via another electronic device of the operator, or via another user interface and/or switch, and may include an option to modify/update the reference model data generated by the control unit 710 with respect to any of the consumer products 190. In some embodiments, the user interface 750 of the computing device 150 may also include a speaker 780 that provides audible feedback (e.g., alerts) to the operator of the computing device 150. It will be appreciated that the performance of such functions by the processor-based control circuit 710 is not dependent on a human operator, and that the control circuit 710 may be programmed to perform such functions without a human operator.

Figure 8:
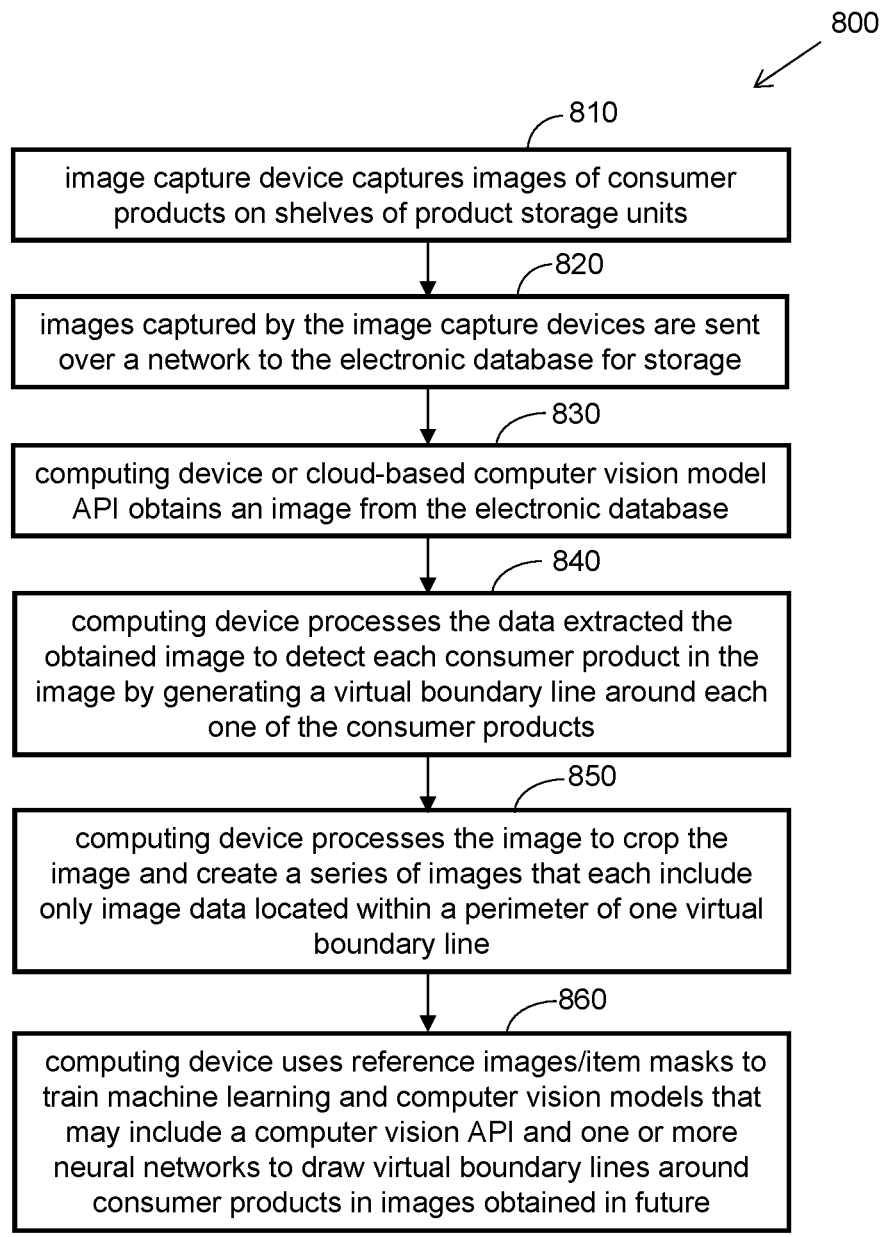
FIG. 8 is a flow chart diagram indicative of an exemplary logic flow during the object localization process in accordance with some embodiments.

In some embodiments, the control circuit 710 of the computing device 150 is involved in the localization function of the system, generally shown by the flow chart depicted in FIG. 8. As mentioned above, a large number of images of shelves 185 are captured by image capture devices 120d positioned at/near product storage units 180 located at facilities of the retailer and in homes/businesses of the customers of the retailer (step 810). As mentioned above, the image capture device 120d is positioned such that its field of view includes at least a portion of one or more shelves 185, and the images of the shelves 185 captured by the image capture device 120d may be transmitted to the electronic database 140 for storage (step 820) in a compressed or uncompressed form and in their original unprocessed form, or in a processed form.

In particular, in some aspects, the image capture device 120d includes a control circuit with a processor programmed to process the captured images to extract raw image data and metadata from the images, and to cause the image capture device 120 to transmit the data extracted from the images to the electronic database 140 for storage. In some aspects, the image capture device 120d captures images of the shelf 185 and transmits the obtained images to an image processing service, which may be cloud-based, or which may be installed on/coupled to the computing device 150 and executed by the control circuit 710.

With reference to FIG. 8, in some embodiments, the computing device 150 is configured to obtain from the electronic database 140, directly, or via a cloud-based computer vision model application programming interface (API), an image of a shelf 185 (see, e.g., FIG. 2) that was captured by the image capture device 120d (step 830). As can be seen in FIG. 2, an exemplary image of a shelf 185 captured by an image capture device 120 may include a number of different consumer products 190 arranged, such that some are unobstructed by any of the other consumer products 190, and some are partially obstructed by other consumer products 190 located on the shelf 185. In certain implementations, the control circuit 710 is configured to process the image (as in FIG. 2) captured by the image capture device 120d to detect (i.e., localize) each individual consumer products 190 in the image. For example, in some aspects, the control circuit 710 is configured to process the image of FIG. 2 to detect the overall size and shape of each of the individual consumer products 190 on the shelf 185 that are captured in the image.

Figure 3:
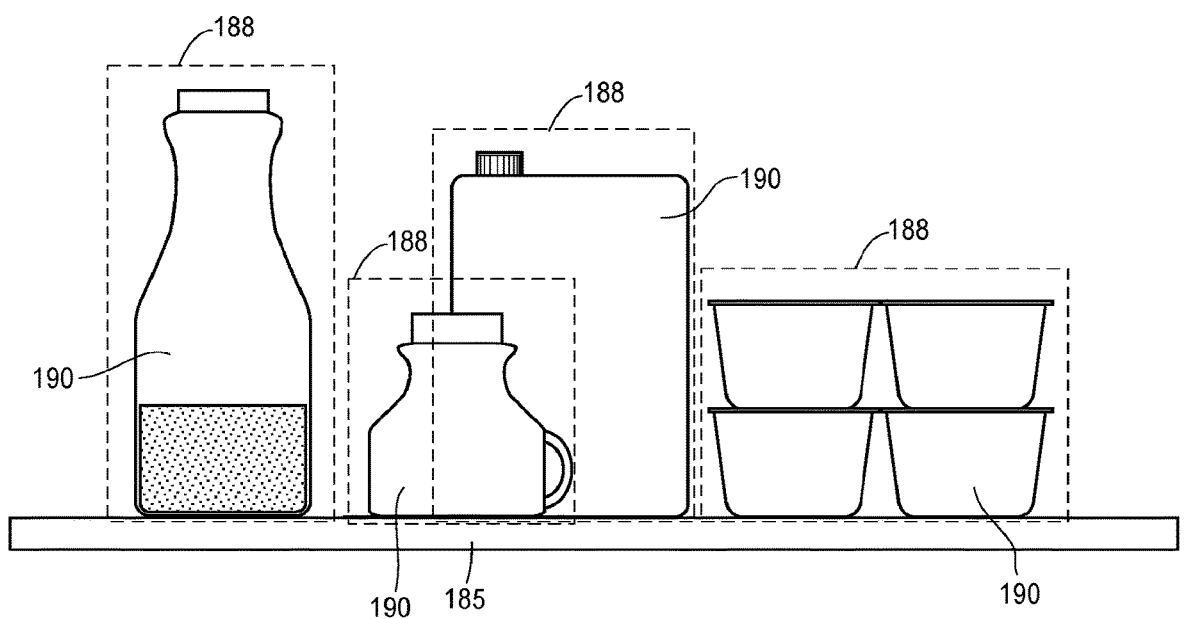
FIG. 3 depicts the image of FIG. 2, but further processed to include a virtual boundary line around each one of the individual consumer products on the shelf.

With reference to FIG. 8, in one aspect, the object localization is achieved by the control circuit 710 of the computing device 150 by way of generating a virtual boundary line 188 around each one of the consumer products 190 detected on the shelf 185 of the product storage unit 180, as shown in FIG. 3 (step 840). In the exemplary image shown in FIG. 3, four different consumer products were detected by the control circuit 710, and each of the consumer products 190 in the image is surrounded by its own respective virtual boundary line 188. In FIG. 3, three of the consumer products 190 are completely unobstructed by other consumer products 190, and one of the consumer products 190 is partially obstructed by one other consumer product 190. In this case, the virtual boundary line 188 that fully encloses the partially obstructed consumer product 190 also encloses a part (i.e., the obstructing part) of the obstructing consumer product 190. As can be seen in FIG. 3, the obstructing consumer product 190 is also fully enclosed by its own virtual boundary line 188, which also encloses a portion of the consumer product 190 that is being obstructed by the obstructing consumer product 190.

In the embodiment shown in FIG. 8, after the general outline of each one of the consumer products 190 on the shelf 185 is detected, and after each individual consumer products 190 detected in the image is bounded by a virtual boundary line 188, the control circuit 710 is programmed to process the image shown in FIG. 3 (e.g., by cropping) to create a series of images that each include only the image data located within a perimeter of one virtual boundary line 188 (step 850). Exemplary individual cropped images created by the control circuit 210 based on the image of FIG. 3 are shown in FIG. 4. The images in FIG. 4, also referred to as item masks, serve as reference bounding box models for each of the consumer products 190 to facilitate identification of the consumer products 190 using the images generated in the image collection apparatus 110.

In the embodiment illustrated in FIG. 8, after reference images or item masks as shown in FIG. 4 are generated, the control circuit 710 is programmed to use the reference images/item masks to train machine learning and computer vision models that may include one or more models (e.g., a neural network-based model or the like) to draw virtual boundary lines 188 around consumer products 190 in images that may be captured in the future by the image capture devices 120 that monitor product storage units 180 in retail facilities and customer homes/businesses (step 860). In some aspects, a machine learning/neural network may be a deep convolutional neural network.

In some implementations, the control circuit 710 is configured to train the machine learning/computer vision models to draw virtual boundary lines 188 around consumer products 190 using a cloud-based computer vision API. As such, the localization function of the control circuit 710 of the computing device 150 generates a large set of reference image data that is used to train computer vision models to detect, in images of shelves 185 captured by image capture devices 120d that monitor product storage units 180 located at retail facilities and customer homes/businesses, the presence of a large variety of different consumer products 190, even those consumer products 190 that are partially obstructed by other consumer products 190 (as seen in FIGS. 3-4).

In some aspects, the reference boundary line/item mask models for various consumer products 190 detected in images of the shelf 185 previously captured by the image capture device 120d are stored in the electronic database 140 for future retrieval by computing device 150 when processing incoming images newly-captured by the image capture device 120d. Since they are generated via computer vision/neural networks trained on hundreds/thousands of images of shelves 185, the reference boundary line/item mask models generated by the computing device 150 (and/or a cloud-based computer vision API) and stored in the electronic database 140 facilitate faster and more precise detection of consumer products 190 on shelves 185 in subsequent images newly-captured by the image capture device 120d. In particular, in one aspect, the control circuit 710 is programmed to correlate image data extracted from the newly-obtained images of shelves 185 to the reference boundary line model data stored in the electronic database 140 to determine whether one or more objects detected in the newly-obtained images match any of the reference boundary line/item mask models associated with previously detected consumer products 190.

Figure 9:
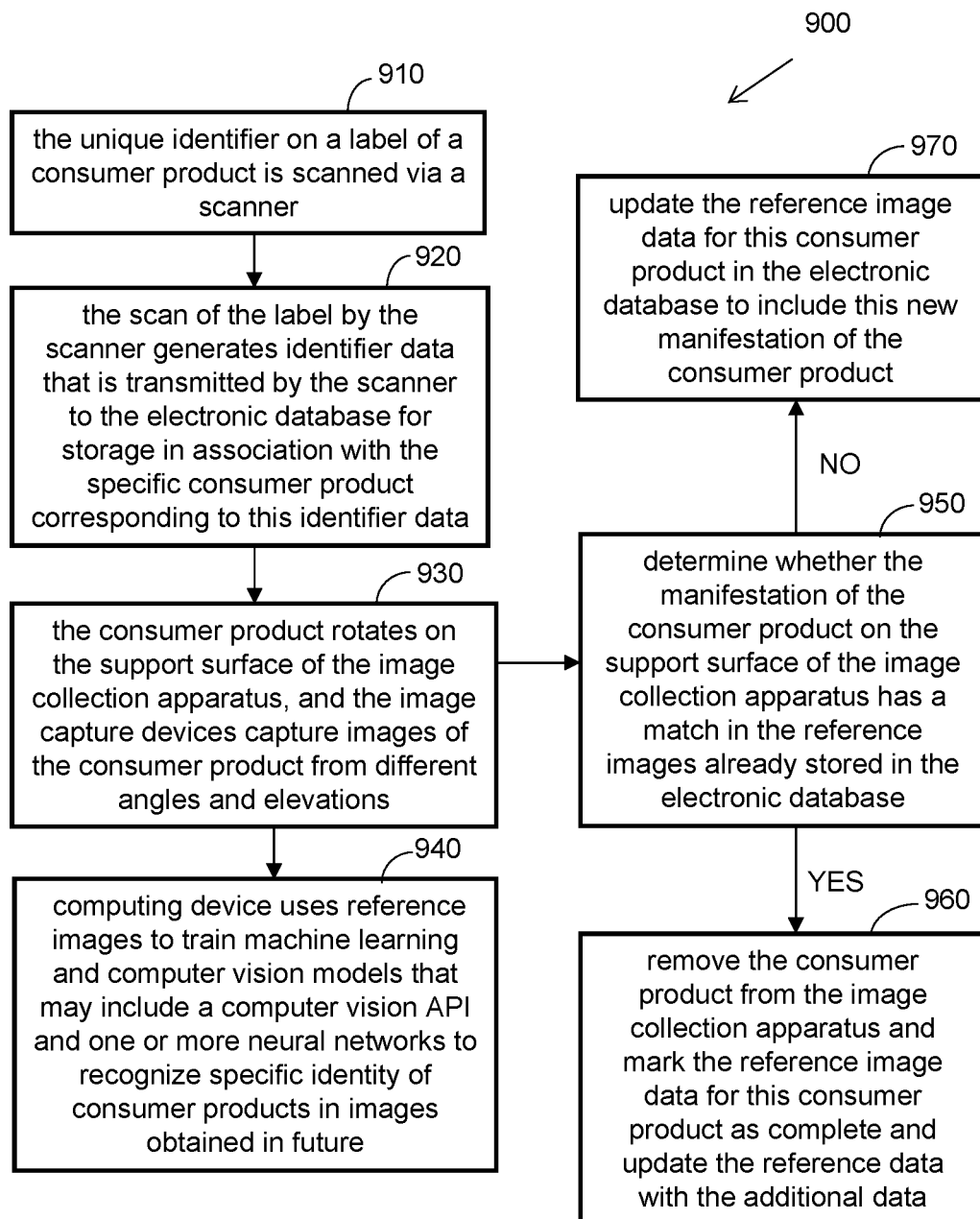
FIG. 9 is a flow chart diagram indicative of an exemplary logic flow during the object identification process in accordance with some embodiments.

As mentioned above, the system 100 is includes an object identification function, facilitate by the image collection apparatus 110. An exemplary logic flow 900 indicative of the object identification function of the system 100 is depicted in FIG. 9 and described with reference to FIGS. 1, 5 and 6. In the example shown in FIG. 9, the first step of the object identification process flow is to identify the consumer product 190 being imaged in the image collection apparatus 110. To that end, a worker of a retail facility scans, via the scanner 125, the unique identifier on a label 195 of a consumer product 190 (step 910). It will be appreciated that, in some embodiments, the worker does not have to take any active steps to scan the consumer product 190 via the scanner 125, and the scanner 125 is equipped with a motion detector or the like, and is configured to automatically scan a consumer product 190 detected by the scanner 125 to have been placed by the worker on the support surface 115 of the image collection apparatus 110.

As mentioned above, the scanner 125 may be a stationary scanner mounted within or near the image collection apparatus 110, as shown in FIG. 1. However, it will be appreciated that the scanner 125 may be a hand-held product-scanning device, or a mobile phone, or tablet of a worker including a sensor configured to scan barcode labels 195 on consumer products 190. In the embodiment illustrated in FIG. 9, the scan of the label 195 of the consumer product 190 by the sensor of the scanner 125 generates identifier data that is transmitted by the scanner 125 over the network 130 to the electronic database 140 for storage in association with specific consumer product 190 corresponding to this identifier data (step 920).

It some embodiments, in addition to the sensor that scans the label 195 of the consumer product 190 to read a barcode and facilitate the identification of the consumer product 190, the scanner 125 includes a sensor that is configured to detect a fill level of a consumable product (e.g., water, milk, juice, etc.) in an interior of the at least one consumer product 190. In one aspect, a scan of the consumer product 190 by a fill level sensor of the scanner 125 generates fill level data, which is then transmitted by the scanner 125 over the network 130 to the electronic database 140 for storage in association with identifier data associated with the consumer product 190. In some implementations, scans of an unopened and unused consumer product 190 and scans of this consumer product 190 when partially consumed (e.g., 25% consumed, 50% consumed, 75% consumed, etc.) by a fill level sensor of the scanner 125 generate reference fill level data of different consumption levels for that particular consumer product 190, which is then transmitted by the scanner 125 over the network 130 to the electronic database 140 for storage in association with the consumer product 190.

The reference fill data stored in the electronic database 140 enables the control circuit 710 to correlate the fill level detected in an interior of a given consumer product 190 (e.g., left-most product in FIG. 2) in an image of a shelf 185 snapped by the image capture device 120d to the reference fill level data stored in the electronic database 140 to determine a level of consumption of the consumer product 190 relative to the fill level in the interior of the consumer product 190 when in the unconsumed state. In some aspects, based on this correlation of the detected consumption level of the consumer product 190 and a determination by the control circuit 710 that the fill level in the interior of the consumer product 190 is below a predefined threshold (e.g., 25%, 10%, etc.), the control circuit 710 is programmed to trigger a replenishment order for this consumer product 190.

It some embodiments, the scanner 125 further includes a sensor that is configured to detect a number of individual items in a pack or stack of a given consumer product 190 (e.g., soft drinks, yoghurt, bananas, etc.). In one aspect, a scan of the consumer product 190 by an item number sensor of the scanner 125 generates pack number data, which is then transmitted by the scanner 125 over the network 130 to the electronic database 140 for storage in association with identifier data associated with the consumer product 190. In some implementations, scans of a consumer product 190 when in a fully stocked state (e.g., 2-pack, 3-pack, 4-pack, 6-pack, etc.), when stacked on top of each other and when not stacked, as well as scans of this consumer product 190 when partially consumed (e.g., 2 cans remaining of the 6-pack, a stack of 3 yoghurts of a 4-pack, etc.) by the item number sensor of the scanner 125 generate reference pack number data indicative of different consumption levels for that particular consumer product 190, which is then transmitted by the scanner 125 over the network 130 to the electronic database 140 for storage in association with the consumer product 190.

The pack number data stored in the electronic database 140 enables the control circuit 710 to correlate the number of individual items of a given consumer product 190 (e.g., right-most product in FIG. 2) detected in an image of a shelf 185 snapped by the image capture device 120d to the reference pack number data stored in the electronic database 140 to determine a level of consumption of the consumer product 190 relative to the fully stock packs/stacks of the consumer product 190. In some aspects, based on this correlation of the detected consumption level of the consumer product 190 and a determination that the number of items remaining in the pack of the consumer product 190 is below a predefined threshold (e.g., 2, 1, etc.), the control circuit 710 is programmed to trigger a replenishment order for the consumer product 190.

With reference back to FIG. 9, after the unique identifier on a label 195 of a consumer product 190 is scanned, the worker sets the consumer product 190 onto the support surface 115 of the image collection apparatus 110 (step 920). FIG. 5 shows an exemplary consumer product 190 in its initially-placed position on the support surface 115 of the image collection apparatus 110. FIG. 6 shows the consumer product 190 on the support surface 115 after the consumer product 190 has rotated by approximately 45 degrees (in the direction shown by the arrow) due to the rotation of the support surface 115. It will be appreciated that the image collection apparatus 110 is shown with only one consumer product 190 on the support surface 115 by way of example and for ease of illustration only, and multiple consumer products 190 may be simultaneously placed onto the support surface 115 for imaging by the image capture devices 120a-120c. Further, the size and shape of the consumer product 190 in FIGS. 5 and 6 has been shown by way of example only, and it will be appreciated that the image collection apparatus 110 may be used to image many different consumer products 190 having various sizes and shapes.

After the consumer product 190 is placed onto the support surface 115, while the consumer product 190 rotates on the support surface 115 of the image collection apparatus 110, the image capture devices 120a-120c, which are set up at three different elevations relative to the support surface 115, may be set up (depending on the speed of rotation of the support surface 115 and the framerate of the image capture devices 120a-120c) to capture a predefined number of images (e.g., 540 or 1080) of the consumer product 190 in different orientations from different angles of view around the consumer product 190 (step 930). In some aspects, the image data extracted from such images by the control circuit 710 and stored in the electronic database 140 in association with the identifier (e.g., barcode, SKU, etc.) data of the consumer products 190 depicted in these images advantageously provides for scalable consumer product data collection sufficient to facilitate computer vision identification of thousands/tens of thousands of different (even if similar) consumer products 190. In some embodiments, the control circuit 710 is programmed to run a distortion operator to randomly apply cropping, resizing, cutouts, color distortion, and blurring in order to clean up the images generated by the image capture devices 120a-120c.

In the embodiment illustrated in FIG. 9, after the reference images are generated in the image collection apparatus 110, the control circuit 710 is programmed to use the reference images to train machine learning and computer vision object classifier models that may include one or more models (e.g., a neural network-based model or the like) to recognize the specific identities of consumer products 190 in images that may be captured in the future by the image capture devices 120a-120c (step 940). As mentioned above in connection with the training of the object localization models, the machine learning/neural network may be a deep convolutional neural network. The control circuit 710 may be configured to train the machine learning/computer vision models to identify the consumer products 190 in various images using a cloud-based computer vision API.

In some aspects, the reference object classification models for various consumer products 190 detected in images captured by the image capture devices 120a-c and generated are stored in the electronic database 140 for future retrieval by computing device 150 when processing incoming images newly-captured by the image capture devices 120a-120c. Since they are generated via computer vision/neural networks trained on hundreds/thousands of images obtained in the image collection apparatus 110, the reference identity image data models generated via the computing device 150 and stored in the electronic database 140 facilitate faster and more precise identification of consumer products 190 in subsequent images newly-captured by the image capture devices 120a-120c.

In one aspect, the control circuit 710 is programmed to correlate image data extracted from the newly-obtained images consumer products 190 to the reference identity image data stored in the electronic database 140 in order to determine whether the consumer product 190 in the newly-obtained images matches any of the reference image models associated with previously-identified consumer products 190. In certain implementations, the control circuit 710 is programmed to update the reference image data stored in the electronic database 140 in association with a given consumer product 190 and to retrain the computer vision object identification model for the consumer product 190. For example, the control circuit 710 may be programmed to analyze each image captured by the image capture devices 120a-120c while the consumer product 190 is rotating on the support surface 115 of the image collection apparatus 110, and to determine whether the manifestation (e.g., fill level, number of items in a pack, storage orientation (e.g., upside-down), obstruction level by another product) of the consumer product 190 detected in the newly-captured image matches any of the manifestations of this consumer product 190 already stored as reference image data in the electronic database 140 (step 950).

If the control circuit determines, that the manifestation of the consumer product detected in the newly-captured image generated in the image collection apparatus 110 matches a manifestations of this consumer product 190 already stored as reference image data in the electronic database 140 (e.g., the newly-obtained image and the already stored reference image both depict the consumer product as being half-filled with a liquid from the same angle with no obstructions), the control circuit 710 is programmed to generate a notification for the worker (e.g., via the worker's electronic hand-held device) to remove the consumer product 190 from the image collection apparatus and enter a notation that the reference image data in the electronic database 140 for this consumer product 190 is complete relative to the newly-obtained images (step 960). On the other hand, if the control circuit determines, that the manifestation of the consumer product detected in the newly-captured image generated in the image collection apparatus 110 has no matching manifestations of this consumer product 190 already stored as reference image data in the electronic database 140 (e.g., the newly obtained image depicts the consumer product 190 at a fill level not represented by an image in the electronic database 140), the control circuit 710 is programmed to transmit a signal to the electronic database 140 to update the electronic database 140 to include this new representation in association with the identifying data for this consumer product 190, thereby expanding the training set of data for the object classification model, and facilitating a faster identification of the consumer product 190 in the future (step 970).

FIG. 10 shows an embodiment of an exemplary method 1000 facilitating computer-vision-based detection of consumer products 190. The method 1000 includes providing a support surface 115 for supporting thereon at least one consumer product 190 to be identified (step 1010). As described above, the support surface 115 is a component of the image collection apparatus 110 that is designed to facilitate consumer product identification by generating a large-scale collection of images of different consumer products at varying view angles and from different heights.

As can be seen in FIG. 1, the image collection apparatus 110 includes image capture devices 120a-120c positioned at different heights relative to the support surface 115 that capture images of the consumer product 190 located on the support surface 115. To that end, the method 1000 includes providing a plurality of digital cameras 120a-120c each arranged at a different height relative to the support surface 115 and positioned such that a field of view of each of the digital cameras 120a-120c includes the consumer product 190 located on the support surface 115 (step 1020). As mentioned above, while FIGS. 5 and 6 show only one consumer product 190 on the support surface 115, the image collection apparatus 110 may be used to generate images of multiple consumer products 190 on the support surface 115 (e.g., to generate reference images of consumer products 190 as they appear in a partially obstructed state).

After the consumer product 190 is placed onto the product support surface 115 of the image collection apparatus 110, the method 1000 of FIG. 10 further includes causing movement of the support surface 115 and/or the plurality of the digital cameras 120a-120c relative to each other to permit the digital cameras 120a-120c to capture images of the consumer product 190 along at least a 180 degree (and more preferably, a full 360 degree) turn around the consumer product 190 (step 1030). As mentioned above, a full 360-degree rotation of the support surface 115 about an axis of rotation with the consumer product 190 thereon may result in, for example 360, 540, 720, or 1080 images of the consumer product 190 in different orientations and from different elevational angles of view.

The method 1000 further includes providing an electronic database 140 configured to store electronic data including image data associated with the images of the consumer product 190 captured by the plurality of the digital cameras 120a-120c and identifier data associated with the consumer product 190 (step 1040). As mentioned above, in some aspects, the image data extracted (e.g., by the control circuit 710 of the computing device 150) from the images generated in the image collection apparatus 110 are stored in the electronic database 140 in association with identifiers (e.g., barcode, SKU, etc.) data of the consumer products 190 depicted in these images, advantageously providing for scalable consumer product data collection sufficient to facilitate computer vision identification of thousands/tens of thousands of different (even if similar) consumer products 190, even when the consumer products 190 are partially obstructed.

The method 1000 further includes providing a computing device 150 including a control circuit 710 and being configured for communication with the digital cameras 120a-120c and the electronic database 140 (step 1050). The method 1000 also includes obtaining, by the computing device 150, the image data and the identifier data associated with a consumer product 190 from the electronic database 140 (step 1060). After the image data and the identifier data is obtained by the computing device 150, the method 1000 further includes using the image data and the consumer product identifier data obtained by the computing device 150 from the electronic database 140 to train a computer-vision consumer product identification model (e.g., a neural network-based model) to generate a reference image data model for recognition of the consumer product 190 from a plurality of viewing angles and in a plurality of orientations when the consumer product 190 is located with other consumer products 190 on a shelf 185 of a consumer product storage unit 180 (step 1070).

In some embodiments, the method 1000 may further include the steps associated with the object detection (i.e., localization) function of the system 100, namely, the steps of: (1) obtaining an image of a consumer product 190 located on the shelf 185 of the consumer product storage unit 180 captured by an image capture device 120d positioned proximate the consumer product storage unit 180; (2) detecting individual consumer products 190 located on the shelf 185; and (3) training (e.g., by the computing device 150) a computer vision consumer product localization model (e.g., a neural network-based model) to generate a reference bounding box model for drawing virtual boundary lines 188 around each one of the individual consumer products 190 on the shelf 185. The method 1000 may further include storing in the electronic database 140 the reference bounding box models for each of the consumer products 190 in association with the identifier data associated with the consumer products 190.

For example, the reference bounding box model/item mask for a bottle of orange juice (e.g., upper-left image in FIG. 4) may be associated in the electronic database 140 with the barcode number or a randomly-generated SKU for Tropicana Orange Juice 1L. In certain implementations, the method 1000 may include obtaining an image (taken by the image capture device 120d) of a consumer product 190 located with other consumer products 190 on the shelf 185 of the consumer product storage unit 180, detecting individual consumer products 190 located on the shelf 185 in the obtained image (e.g., by correlating the objects detected on the shelf 185 to the reference bounding box models/item masks stored in the electronic database 140), and then correlating the objects detected in the image to the reference image data models, which were generated in the image collection apparatus 110 and are stored in association with identifiers of specific consumer products 190 in the electronic database 140, in order to recognize an identity of the consumer products 190 representing the objects detected in the images of the shelf 185.

The above-described exemplary embodiments of the methods and systems of detecting and identifying consumer products advantageously provide a scalable solution for collecting data sufficient to enable precise detection of consumer products on shelves of consumer product storage units and for precise consumer product identification over a very large variety of different consumer products. In particular, by separating the object localization/detection function from the object recognition/identification function, the systems methods described herein are able to advantageously interconnect the object localization and identification algorithms to scale identification of consumer products by utilizing the data obtained in the more complex identification function to retrain the simpler localization function. As such, the methods and systems described herein provide for precise and efficient object detection and identification in images while keeping the overall data requirements lower than those that would be required by comparative conventional product detection and recognition systems.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for facilitating computer-vision-based identification of consumer products, the system comprising:
   a support surface for supporting thereon at least one consumer product to be identified;
   a plurality of digital cameras each arranged at a different height relative to the support surface and positioned such that a field of view of each of the digital cameras includes the at least one consumer product located on the support surface;
   wherein movement of at least one of the support surface and the plurality of the digital cameras relative to each other permits the digital cameras to capture images of the at least one consumer product along at least a 180 degree turn around the at least one consumer product;
   an electronic database configured to store electronic data including:
      image data associated with the images of the at least one consumer product captured by the plurality of the digital cameras; and
      identifier data associated with the at least one consumer product; and
   a computing device in communication with at least one of the digital cameras and the electronic database, the computing device including a control circuit configured to:
      obtain the image data and the identifier data from the electronic database; and
      using the image data and the consumer product identifier data obtained by the computing device from the electronic database, train a computer vision consumer product identification model to generate a reference image data model to be used for recognition of the at least one consumer product from a plurality of viewing angles when the at least one consumer product is located on a shelf of a consumer product storage unit.

2. The system of claim 1, wherein the support surface is configured to rotate along a full 360 degree revolution relative to an axis of rotation, and wherein each of the digital cameras is permitted to capture images of the at least one consumer product along a full 360 degree turn round the at least one consumer product located on the support surface.

3. The system of claim 2, wherein the support surface is configured to rotate at a speed of from 1 to 5 degrees per second, and wherein the digital cameras are configured to capture from 1 to 10 frames per second.

4. The system of claim 1, wherein the support surface is monochrome, and further comprising a monochrome background positioned around at least a portion of the support surface in the field of view of each of the digital cameras, wherein the monochrome support surface and the monochrome background increase capacity of the images captured by the digital cameras for background subtraction.

5. The system of claim 1, further comprising at least one scanner including at least a first sensor configured to:
scan an identifier of the at least one consumer product; and
generate the identifier data for storage in the electronic database based on a scan of the identifier of the at least one consumer product by the scanner.

6. The system of claim 5, wherein:
the at least one scanner further includes at least a second sensor configured to detect a fill level in an interior of the at least one consumer product and to generate fill level data for storage in the electronic database in association with the at least one consumer product;
the electronic database further stores reference fill level data indicating a fill level in the interior of the at least one consumer product when in an unconsumed state and when in a at least partially consumed state; and
the control circuit is programmed to correlate the fill level in the interior of the at least one consumer product detected by the at least one scanner to the reference fill level data to determine a level of consumption of the at least one consumer product relative to the fill level in the interior of the at least one consumer product when in the unconsumed state.

7. The system of claim 5, wherein:
the at least one scanner includes at least a third sensor configured to detect a number of individual items in a pack of the at least one consumer product;
the electronic database further stores reference pack number data indicating a number of the individual items in the pack when the pack is in a fully stocked state; and
the control circuit is programmed to correlate the number of individual items in the pack of the at least one consumer product detected by the third sensor to the reference pack number data to determine how many of the individual items in the pack have been consumed relative to the number of the individual items in the pack when the pack is in a fully stocked state.

8. The system of claim 1, wherein the control circuit of the computing device is further configured to:
obtain a first image of a consumer product located on the shelf of the consumer product storage unit captured by at least one image capture device positioned proximate the consumer product storage unit;
detect individual consumer products located on the shelf; and
train a computer vision consumer product localization model to generate a reference bounding box model for drawing virtual boundary lines around each one of the individual consumer products on the shelf.

9. The system of claim 8, wherein the electronic database further stores the reference image data model and the reference bounding box model for the at least one consumer product in association with the identifier data associated with the at least one consumer product.

10. The system of claim 9, wherein the computing device is further configured to:
obtain a second image of a consumer product located with the other consumer products on the shelf of the consumer product storage unit, the second image being captured by the at least one image capture device positioned proximate the consumer product storage unit;
detect individual consumer products located on the shelf in the obtained image; and
correlate image data from the obtained second image to reference image data model and the reference bounding box model in order to recognize an identity of each of the detected individual consumer products located on the shelf.

11. A method of facilitating computer-vision-based identification of consumer products, the method comprising:
providing a support surface for supporting thereon at least one consumer product to be identified;
providing a plurality of digital cameras each arranged at a different height relative to the support surface and positioned such that a field of view of each of the digital cameras includes the at least one consumer product located on the support surface;
causing movement of at least one of the support surface and the plurality of the digital cameras relative to each other to permit the digital cameras to capture images of the at least one consumer product along at least a 180 degree turn around the at least one consumer product;
providing an electronic database configured to store electronic data including:
image data associated with the images of the at least one consumer product captured by the plurality of the digital cameras; and
identifier data associated with the at least one consumer product; and
providing a computing device in communication with at least one of the digital cameras and the electronic database the computing device including a control circuit;
by the control circuit:
obtaining the image data and the identifier data from the electronic database; and
using the image data and the consumer product identifier data obtained by the computing device from the electronic database, train a computer vision consumer product identification model to generate a reference image data model for recognition of the at least one consumer product from a plurality of viewing angles when the at least one consumer product is located on a shelf of a consumer product storage unit.

12. The method of claim 11, further comprising causing the support surface to rotate along a full 360 degree revolution relative to an axis of rotation, and wherein each of the digital cameras is permitted to capture images of the at least one consumer product along a full 360 degree turn round the at least one consumer product located on the support surface.

13. The method of claim 12, further comprising causing the support surface to rotate at a speed of from 1 to 5 degrees per second, and capturing, by the digital cameras from 1 to 10 frames per second of the at least one consumer product on the support surface during rotation.

14. The method of claim 11, wherein the support surface is monochrome, and further comprising providing a monochrome background positioned around at least a portion of the support surface in the field of view of each of the digital cameras, wherein the monochrome support surface and the monochrome background increase capacity of the images captured by the digital cameras for background subtraction.

15. The method of claim 11, further comprising:
providing at least one scanner including at least a first sensor;
scanning an identifier of the at least one consumer product via the at least one scanner; and
generating the identifier data for storage in the electronic database based on the scanning of the identifier of the at least one consumer product by the scanner.

16. The method of claim 15, further comprising:
providing the at least one scanner with at least a second sensor;
via the at least one scanner, detecting a fill level in an interior of the at least one consumer product, and generating fill level data for storage in the electronic database in association with the at least one consumer product;
storing in the electronic database further reference fill level data indicating a fill level in the interior of the at least one consumer product when in an unconsumed state and when in a at least partially consumed state; and
by the control circuit, correlating the fill level in the interior of the at least one consumer product detected by the at least one scanner to the reference fill level data to determine a level of consumption of the at least one consumer product relative to the fill level in the interior of the at least one consumer product when in the unconsumed state.

17. The method of claim 15, further comprising:
providing the at least one scanner with at least a third sensor:
detecting, via the at least one scanner, a number of individual items in a pack of the at least one consumer product;
storing in the electronic database reference pack number data indicating a number of the individual items in the pack when the pack is in a fully stocked state; and
by the control circuit, correlating the number of individual items in the pack of the at least one consumer product detected by the third sensor to the reference pack number data to determine how many of the individual items in the pack have been consumed relative to the number of the individual items in the pack when the pack is in a fully stocked state.

18. The method of claim 11, further comprising, by the computing device:
obtaining a first image of a consumer product located on the shelf of the consumer product storage unit captured by at least one image capture device positioned proximate the consumer product storage unit;
detecting individual consumer products located on the shelf; and
training a computer vision consumer product localization model to generate a reference bounding box model for drawing virtual boundary lines around each one of the individual consumer products on the shelf.

19. The method of claim 18, further comprising storing in the electronic database the reference image data model and the reference bounding box model for the at least one consumer product in association with the identifier data associated with the at least one consumer product.

20. The method of claim 19, further comprising, by the computing device:
obtaining a second image of a consumer product located with the other consumer products on the shelf of the consumer product storage unit, the second image being captured by the at least one image capture device positioned proximate the consumer product storage unit;
detecting individual consumer products located on the shelf in the obtained image; and
correlating image data from the obtained second image to reference image data model and the reference bounding box model in order to recognize an identity of each of the detected individual consumer products located on the shelf.

* * * * *